Oct. 16, 1923.
C. VOGT
LOCKING DEVICE
Filed Aug. 11, 1921
1,471,077
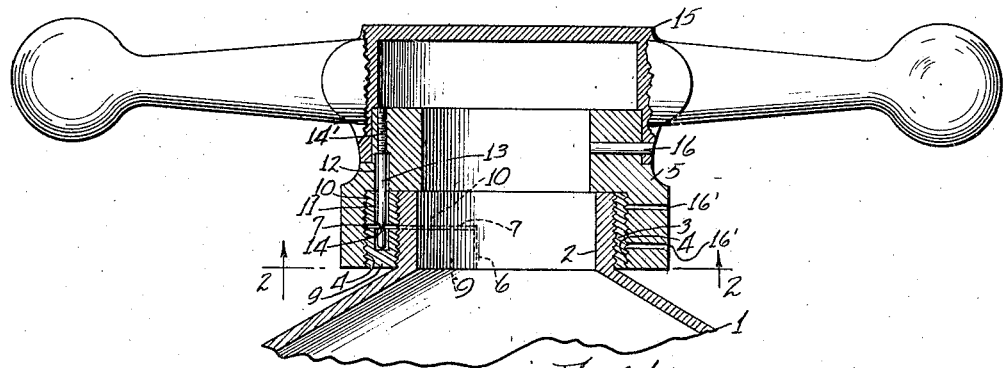
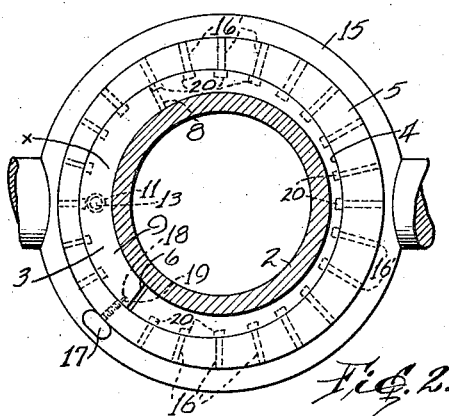
INVENTOR
C. Vogt
BY
ATTORNEYS Patented Oct. 16, 1923.

1,471,077

UNITED STATES PATENT OFFICE.

CHARLES VOGT, OF CHICAGO, ILLINOIS.

LOCKING DEVICE.

Application filed August 11, 1921. Serial No. 491,436.

*To all whom it may concern:*

Be it known that I, CHARLES VOGT, a citizen of the United States, and a resident of Chicago, in the county of Cook and State of Illinois, have invented a new and useful Improvement in Locking Devices, of which the following is a full, clear, and exact description.

My invention relates to devices for coupling tubular members together, and it consists in the combinations, constructions, and arrangements herein described and claimed.

An object of my invention is to provide an improvement over the locking device disclosed in my prior application for Patent, Serial No. 472,514, filed May 25, 1921, said improvement consisting in the provision of a locking device operable to occasion the locking of connected members against movement relatively in one direction, while permitting free movement thereof in the opposite direction.

A further object of my invention is to provide a device for coupling two tubular members together in alinement and for normally preventing the disconnection of the coupled members.

A further object of my invention is to provide a device of the character described that is key-controlled, secret knowledge as to the adjustment of the key with the locking mechanism to actuate the locking mechanism so that the connected members may be disconnected being required.

A further object of my invention is to provide a device of the character described that is relatively simple in construction, not likely to get out of order easily, and thoroughly effective for the purpose intended.

Other objects and advantages will appear in the following specification, and the novel features of the invention will be particularly pointed out in the appended claims.

My invention is illustrated in the accompanying drawings, forming part of this application, in which Figure 1 is a vertical section through a portion of an automobile radiator equipped with the invention.

Figure 2 is a section along the line 2—2 of Figure 1.

Figure 3 is a view similar to Figure 1, showing the use and application of another embodiment of the same invention, and Figure 4 is a section along the line 4—4 of Figure 3.

Referring now to the drawings, 1 denotes a fragmentary portion of a radiator provided with an exteriorly threaded filler tube 2. A locking ring or bushing 3 is threaded interiorly for engagement with the exteriorly threaded filler tube 2. The locking ring or bushing 3 has a greater thickness at one point, as at $x$, than at any other point around its circumference, being fashioned to taper uniformly from the point $x$ to a point diametrically opposed thereto. The locking ring 3 may have concentric inner and outer walls but is preferably formed with eccentric inner and outer walls, as described, to provide a relatively thick portion at $x$ for a purpose which will be hereinafter set forth.

The locking ring 3 is threaded exteriorly for engagement with a threaded socket 4 that is defined by enlarging the bore of a coupling member 5 for a portion of the length of the latter. The locking ring 3 is split by a slit 6 that extends from one end wall thereof inwardly to a line midway between its ends, then circumferentially, as at 7, to the point 8, and then outwardly or transversely of the ring to the opposite end wall thereof. It is to be observed that relatively narrow alined end portions 9 and 10 of the locking ring are thus provided, each constituting an integral section of the complete ring, as best seen in Figure 1. It is also to be observed that the locking ring 3 has its greatest thickness at a point approximately midway between the transverse parts 6 and 8 of the slit, splitting the ring in the manner described.

A socket 11 is provided in the relatively narrow end portion 10 intermediate the inner and outer walls thereof at a point approximately midway between the ends of the portions 9 and 10. The socket 11 extends entirely through the end portion 10 into the contiguous wall of the end portion 9. An opening or bore 12 extending inwardly from the outer wall of the coupling member 5 is alined with socket 11. A pin 13, loosely received in the socket 11 and projecting into the bore 12, is fashioned with an annular groove 14 in the outer wall of the portion thereof interposed between the adjacent walls of the portions 9 and 10 of the locking ring 3. A retaining screw 14' threaded into the bore 12 at its upper end prevents displacement of the pin 13.

From the foregoing description of the various parts of the device, the operation thereof may be readily understood. In the embodiment of the invention illustrated, I show the device applied to an automobile radiator. A radiator cap 15 is permanently secured to the coupling member 5 in any suitable known manner, as by means of rivets 16, after the locking ring 3 has been placed in the socket 4 and the pin 13 has been arranged to enter the socket 11 in the manner described. The cap, coupling member, and locking ring 3 may then be screwed on the filler tube 2 as a unit. It will be manifest that the pin 13 will be carried by the member 5 and will swing slightly about the groove 14 as a pivot, thereby moving the relatively narrow end portions 9 and 10 of the locking ring 3 so that they will not bind the filler tube 2, when the cap 15 is being turned clockwise. The expanded ring 3 will grip the member 5 and will rotate therewith. In consequence, the locking ring, the coupling member 5, and the cap 15 may be turned freely until the position illustrated in Figure 1 is attained. Should an attempt be made to turn the coupling member 5 in the reverse direction, or counter-clockwise, the pin 13 would pivot at the groove 14 in the reverse direction and would move the relatively narrow end portions 9 and 10 relatively to one another sufficiently to exert a binding action on the threads of the filler tube 2 and to preclude movement of the coupling member 5. The contraction of the ring about the tube 2 prevents the ring from rotating with the member 5. The member 5 is secured to the ring by the pin, and in being rotated anti-clockwise will cause the pin to bind the ring more firmly on the tube.

The coupling member 5 is fashioned with a plurality of openings 16' arranged to extend radially through its wall, as shown. These openings are threaded for engagement with a key 17 that has a relatively reduced end portion 18. One of the openings 16' registers with an opening 19 in the end portion 10 adjacent to its extremity and the reduced end portion 18 of the key 17 is adapted to closely fit the opening 19. The remaining openings 16' are arranged respectively to register with openings 20 in the locking ring 3. The openings 20 are relatively large and are adapted to loosely receive the end portion 18 of the key 17. When the key 17 has been projected into the opening 16 that registers with the opening 19, the engagement of the end portion of the key with the end portion 10 of the locking ring 3 will lock the ring to the member 5 so that no swinging of the pin 13 will result when the member 5 is rotated. The pin therefore will not cause the ring to bind upon the tube, and in consequence, the coupling member 5 may be turned freely in either direction. The several openings 16 may be appropriately marked in any suitable manner so that authorized persons may instantly project the key 17 into operative position with respect to the locking ring 3, while unauthorized persons will have no means of knowing when the key 17 has been placed in the proper opening. The device is therefore particularly well adapted for application to radiator filler tubes in order to prevent the theft or accidental displacement of the radiator caps therefrom.

Referring now to Figures 3 and 4 of the drawings, I show a slightly different form embodying the same invention, as applied to an interiorly threaded filler tube 30 of a radiator 31. A locking ring 32 is split to provide relatively narrow alined end portions 33 and 34. The locking ring 32 is threaded interiorly for engagement with a coupling member 35 and is threaded exteriorly for engagement with the interiorly threaded filler tube 30. The locking ring 32 is provided with an outwardly extending annular flange 36, thereby defining a shoulder 37 against which the upper end of the filler tube 30 abuts when the coupling member 35 has been moved into the position illustrated. The coupling member 35 is enlarged adjacent to its upper end to provide a flange 38 arranged to overlie the upper end of the flange 36. An opening 39 through the flange 38 registers with a socket 40 in the locking ring 32. As in the form of the device illustrated in Figure 1, the socket 40 extends through the end portion 34 into the adjacent wall of the end portion 33 and is adapted to loosely receive a pin 41. The latter protrudes from the socket 40 into the bore 39 and is maintained in place by a screw 42. The pin 41 is fashioned with an annular groove 43 in the portion thereof interposed between the adjacent walls of the end portions 33 and 34 of the locking ring. The coupling member 35 is permanently secured to a radiator cap 44 by means of rivets 45 or any other suitable known means.

The operation of the form of the device illustrated in Figures 3 and 4 is identical in essential respects with the operation of the form of the device illustrated in Figure 1, which has already been described. The key 17 may be projected through any one of the series of openings 46 in the locking ring 32 until the reduced end portion 18 of the key is disposed within a registering socket 47 in the coupling member 35. Only one of the sockets 47 is adapted to closely fit the reduced end portion 18 of the key 17. The key must therefore be projected into the proper socket in order that the coupling member 35 may be displaced from the filler tube 30.

I claim:

1. A device of the character described comprising a split locking ring fashioned to provide cooperating relatively narrow end portions, said locking ring being threaded for connection with a tublar member, an additional tubular member threaded for connection with the split locking ring and having a portion thereof arranged to overlie the end of the locking ring, and means projected through registering openings in the overlying portion of the last named tubular member and in the adjacent end portion of the locking ring into a socket in the adjacent wall of the other end portion for limiting the movements of the said end portions relatively to one another.

2. A device of the character described comprising a split locking ring threaded for connection with a tubular member and fashioned with cooperating relatively narrow ends portions, a cooperating tubular member having a threaded connection with the locking ring and formed to provide a flange arranged to overlie the outer end of the locking ring, said flange, the end portion contiguous thereto, and the other end portion of the locking ring being provided with registering openings, a pin loosely received in said registering openings for limiting the movements of the end portion remote from the flange relatively to the second named tubular member, and means adapted to be placed in a certain position with respect to the second named tubular member and the last named end portion of the locking ring for preventing movement of the latter relatively to the former.

3. A device of the character described comprising a locking ring threaded for connection with a tubular member and split inwardly from one end to the median line thereof, then along the median line a determined distance, and then transversely to the other end of the ring, whereby cooperating relatively narrow end portions are provided, a cooperating tubular member having a threaded connection with the locking ring and formed to provide a flange arranged to overlie the outer end of the locking ring, said flange, the end portion contiguous thereto, and the other end portion of the locking ring being provided with registering openings, a pin loosely received in said registering openings for limiting the movements of the end portion remote from the flange relatively to the second named tubular member, and means adapted to be placed in a certain position with respect to the second named tubular member and the last named end portion of the locking ring for preventing movement of the latter relatively to the former.

4. The combination with an exteriorly threaded tubular member, of a split locking ring threaded interiorly for connection therewith and fashioned with cooperating relatively narrow end portions, said locking ring also being threaded exteriorly, an additional tubular member formed to provide a threaded socket and an inwardly extending flange, said last named tubular member being arranged with the flange overlying the outer end of the locking ring, said flange, the end portion contiguous thereto, and the other end portion of the locking ring being provided with registering passages extending intermediate the inner and outer walls of the locking ring and terminating short of the inner end wall of the latter, a pin loosely received in the registering openings and arranged to extend beyond the outer end of the locking ring, whereby movements of the last named end portion of the locking ring relatively to the second tubular member are limited, and other means for preventing movement of the last named end portion of the locking ring relatively to the second named tubular member.

CHARLES VOGT.